(12) United States Patent
Nedachi

(10) Patent No.: US 9,370,890 B2
(45) Date of Patent: Jun. 21, 2016

(54) MOLDING DIE FOR AN OPERATING KNOB

(71) Applicants: Mitsuyuki Nedachi, Tokyo (JP); Yasuyuki Nedachi, Tokyo (JP)

(72) Inventor: Mitsuyuki Nedachi, Tokyo (JP)

(73) Assignees: Mitsuyuki Nedachi, Tokyo (JP); Yasuyuki Nedachi, Tokyo (JP)

(*) Notice: Subject to any disclaimer, the term of this patent is extended or adjusted under 35 U.S.C. 154(b) by 0 days.

(21) Appl. No.: 14/605,981

(22) Filed: Jan. 26, 2015

(65) Prior Publication Data

US 2015/0209987 A1    Jul. 30, 2015

(30) Foreign Application Priority Data

Jan. 29, 2014  (JP) ................................. 2014-014231

(51) Int. Cl.
| | |
|---|---|
| B29C 45/44 | (2006.01) |
| B29L 31/46 | (2006.01) |
| B29C 45/36 | (2006.01) |
| B29C 45/26 | (2006.01) |

(52) U.S. Cl.
CPC ........... *B29C 45/4407* (2013.01); *B29C 45/261* (2013.01); *B29C 45/36* (2013.01); *B29L 2031/46* (2013.01)

(58) Field of Classification Search
CPC ....................................................... B29C 45/36
USPC ........................................... 425/577, DIG. 58
See application file for complete search history.

(56) References Cited

U.S. PATENT DOCUMENTS

| | | | | |
|---|---|---|---|---|
| 5,588,329 | A | 12/1996 | Nedachi | |
| 7,632,447 | B2* | 12/2009 | Swistak et al. | 425/DIG. 58 |
| 8,147,238 | B1* | 4/2012 | Zou et al. | 425/DIG. 58 |
| 8,529,244 | B2* | 9/2013 | Gong et al. | 425/DIG. 58 |
| 2005/0208172 | A1* | 9/2005 | Buttigieg | 425/DIG. 58 |
| 2012/0321742 | A1* | 12/2012 | Wang et al. | 425/577 |

FOREIGN PATENT DOCUMENTS

JP        6-280974 A    10/1994

* cited by examiner

*Primary Examiner* — Tim Heitbrink
(74) *Attorney, Agent, or Firm* — Hauptman Ham, LLP

(57) ABSTRACT

The present invention includes: core pin that forms fitting hollow part of an operating lever in the operating knob in addition to forming thin-diameter part including upper inclined surface and lower inclined surface on the upper part of the operating knob; upper die and lower die that form a periphery of the upper part and the lower part of operating knob; and intermediate slide core which is advanceable and restorable towards core pin between upper die and lower die, and has abutting part of upper inclined surface of core pin, as well as step part that is formed in the lower part of the abutting part and forms thin-walled part in the base of check claw.

9 Claims, 7 Drawing Sheets

MOLDING DIE FOR AN OPERATING KNOB

CROSS REFERENCE TO RELATED APPLICATIONS

This application is based upon and claims the benefit of priority under from the prior Japanese Patent Application No. 2014-14231, filed on Jan. 29, 2014, the entire contents of which is hereby incorporated by references.

BACKGROUND OF THE INVENTION

1. Field of the Invention

The present invention relates to a molding die for an operating knob which can be fixed to the heads of various operating levers with a single touch.

2. Description of the Related Art

Conventionally, a resin gripper (hereinafter, referred to as an "operating knob") is mounted on the heads of side brake levers, shift levers and hood opening support knobs of automobiles, as well as the heads of other various operating levers, in order to improve operability and touch.

The applicant has already provided the mounting structure of an operating knob, comprising: lever shaft 1 which provides peripheral groove 1a and rotation stop projection 1g; holder 2 which integrally forms second lock claw 2e locked to peripheral groove 1a, first lock claw 2d locked to locking hole 3c provided in shift knob 3, and rotation stop groove 2f locked to rotation stop projection 1g; and shift knob 3 which forms locking hole 3c locked to first lock claw 2d (see U.S. Pat. No. 5,588,329).

In the mounting structure of the operating knob, the operating knob is formed by three components, holder 2, second lock claw 2e, and shift knob 3, requiring multiple dies to be prepared for each of the three components, with a problematic unavoidable increase in cost. Furthermore, the production and mounting to an operating lever is also troublesome.

SUMMARY OF THE INVENTION

Some aspects of the invention are advantageous in that they provide a molding die for an operating knob that can be integrally molded, reduces costs and is easily produced and mounted.

In order to achieve the advantages, a molding die for an operating knob according to the present invention, which forms a check claw that protrudes inside a tube body and is outwardly swingable and restorable, comprises: a core pin that forms a fitting hollow part of an operating lever in the operating knob in addition to forming a thin-diameter part including an upper inclined surface and a lower inclined surface on the upper part of the operating knob; an upper die and a lower die which form the periphery of the upper part and the lower part of the operating knob; and an intermediate slide core which is advanceable and restorable towards the core pin between the upper die and the lower die, in addition to having an abutting part that abuts on the upper inclined surface of the core pin, as well as a step part that is formed in the lower part of the abutting part and forms a thin-walled part in the base of the check claw.

According to the configuration, in the combined state of the core pin, upper die, lower die, and intermediate slide core, resin is injected into the internal space, the upper die and lower die are separated after curing the resin, the intermediate slide core is restored, and the resin part is further separated from the core pin, allowing operating knob 1 illustrated in FIG. 6 to be molded. In FIG. 6, 1a, 1a are check claws, with 1b, 1b are thin-walled parts, and 1c is a fitting hollow part for receiving the operating lever.

Note that in the drawing, 2 is a core pin that forms fitting hollow part 1c of the operating lever, while thin-diameter part 2c, including upper inclined surface 2a and lower inclined surface 2b, is formed in the upper part thereof.

As illustrated in FIG. 7, when operating lever 3, with locking parts 3a, 3a having a small diameter preliminarily formed at a predetermined position, is fitted in fitting hollow part 1c of operating knob 1 thus configured, check claws 1a, 1a are outwardly swung and opened by the tip of operating lever 3.

Furthermore, when operating knob 1 is pushed towards operating lever 3, check claws 1a, 1a are each restored inward, with the tip thereof restored inside locking parts 3a, 3a of operating lever 3 and locked in the upper part thereof. Consequently, operating knob 1 is completely fixed to operating lever 3, thereby making detachment thereof impossible.

In one embodiment of the present invention, the intermediate slide core is provided in multiple numbers towards the core pin. According to this one embodiment, as illustrated in FIG. 6, multiple check claws 1a, 1a are formed in operating knob 1.

Naturally, only a single check claw 1a need be formed in operating knob 1; however, when check claws 1a, 1a are formed in multiple numbers in operating knob 1, operating knob 1 is firmly fixed to operating lever 3. Moreover, when four intermediate slide cores 4 are radially provided, four check claws 1a can be radially formed in operating knob 1.

In one embodiment of the present invention, the intermediate slide core is advanced and restored in conjunction with the separation between the upper die and the lower die. According to this one embodiment, the power used for the separation between the upper die and the lower die can be economically utilized for the advancement and restoration of the intermediate slide core.

In one embodiment of the present invention, a control rod is provided in the upper die or the lower die which are separatingly moved, the control rod being that is provided at a predetermined angle towards the intermediate slide core, and a guide hole is provided in the intermediate slide core at the angle to receive the control rod. According to this one embodiment, the advancement and restoration of the intermediate slide core can be easily synchronized with the separation between the upper die and the lower die.

The molding die for the operating knob of the present invention is capable of providing an operating knob that can be integrally molded, reduces costs and is easily produced and mounted.

The present invention has been briefly described thus far. Hereinafter, the best mode for carrying out the present invention will be described in detail with reference to the accompanying drawings.

DESCRIPTION OF THE PREFERRED EMBODIMENTS

Figure 1:
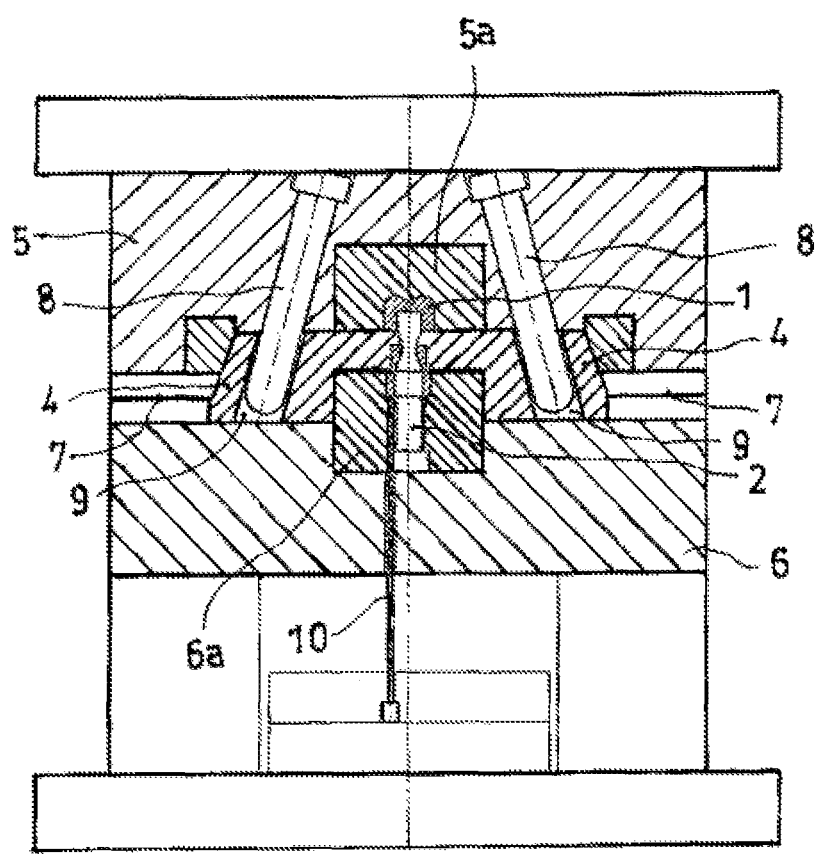
FIG. 1 is a cross-sectional view of the main part illustrating the molding state of an operating knob by a molding die of the present invention.

In FIGS. 1 to 6, 2 is the core pin, while 4 is the intermediate slide core. Moreover, 5 is an upper die having core part 5a, while 6 is a lower die having core part 6a. Core part 5a of upper die 5 and core part 6a of lower die 6 are preliminarily processed to form the periphery of the upper part and the lower part of operating knob 1 to be molded.

Core pin 2 is set by core part 6a of lower die 6, while thin-diameter part 2c including upper inclined surface 2a and lower inclined surface 2b is formed in the upper part thereof.

Intermediate slide cores 4 are provided between upper die 5 and lower die 6 to face each other so as to be advanceable and restorable towards core pin 2. Intermediate slide core 4 are each advanceable and restorable towards core pin 2 along guide rail 7 formed in lower die 6.

Furthermore, intermediate slide cores 4 have abutting part 4a that abuts on upper inclined surface 2a of thin-diameter part 2c of core pin 2, as well as step part 4b that is formed in the lower part of the abutting 4a part and forms thin-walled parts 1b, 1b in the base of check claws 1a, 1a (see FIGS. 2 to 5). That is, abutting part 4a of intermediate slide cores 4 protrudes more than step part 4b formed in the lower part of abutting part 4a.

Furthermore, in the drawing, intermediate slide cores 4 are configured to be advanced and restored in conjunction with the separation between upper die 5 and lower die 6. That is, the tips of control rods 8, 8, outwardly provided from upper die 5 towards intermediate slide cores 4 at a predetermined angle, are inserted in guide holes 9, 9 provided in intermediate slide cores 4.

In the configuration, when upper die 5 is separated from lower die 6 and raised, intermediate slide cores 4 are each outwardly slid by control rods 8, 8 to be separated from core pin 2 and molded operating knob 1.

Moreover, when upper die 5 is lowered thereafter, the tips of control rods 8, 8 are fitted into guide holes 9, 9 of intermediate slide cores 4 such that intermediate slide cores 4 are set to be advanced and set inwardly towards core pin 2. Consequently, the subsequent molding can be performed. Note that the setting directions of control rods 8, 8 and guide holes 9, 9 are not limited to the above but may be in any direction. Moreover, intermediate slide cores 4 can be advanced and restored by other means in conjunction with the separation between upper die 5 and lower die 6.

In the drawing, 10 is a vertically movable ejector pin that removes molded operating knob 1 from core pin 2, and is provided in multiple numbers, although this is not illustrated.

Operating knob 1 is molded as follows by a die thus configured. First, after core pin 2, upper die 5, lower die 6, and intermediate slide cores 4 are set to the advanced position (see FIG. 1), resin is injected into the internal space configured by core part 5a of upper die 5, intermediate slide cores 4, and core part 6a of lower die 6. For example, resin is injected from an injection hole (not illustrated) provided in upper die 5a.

Figure 2:
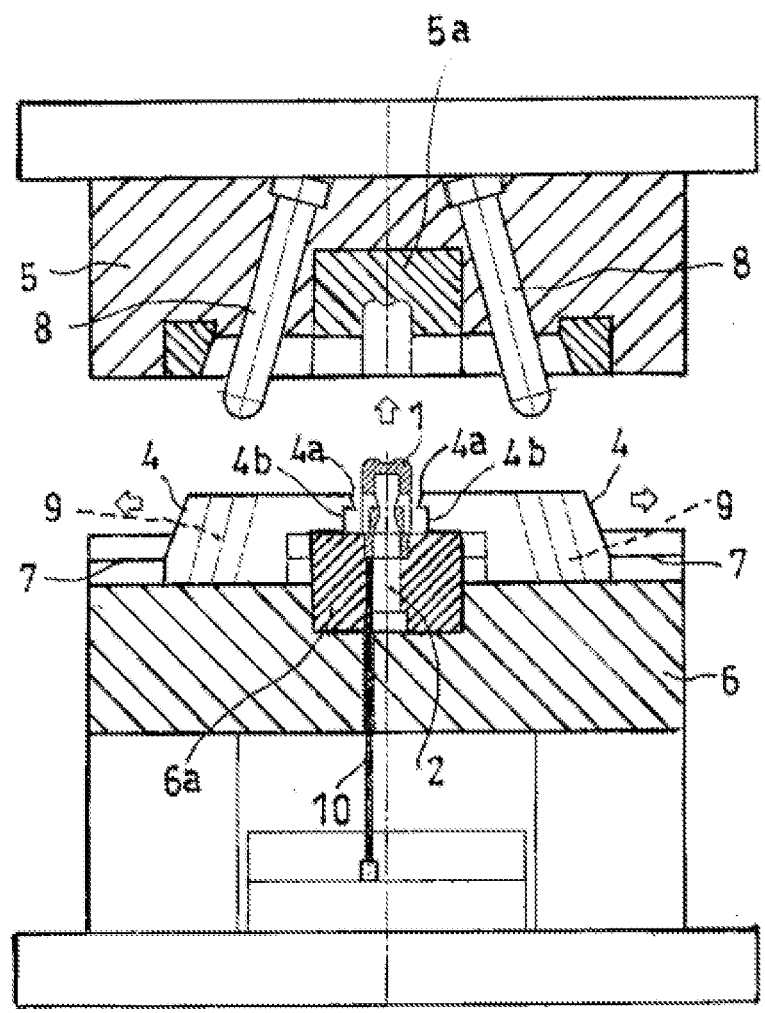
FIG. 2 is a cross-sectional view of the main part illustrating separation of an upper die and a lower die and a restored state of an intermediate slide core, upon completion of molding.
Figure 3:
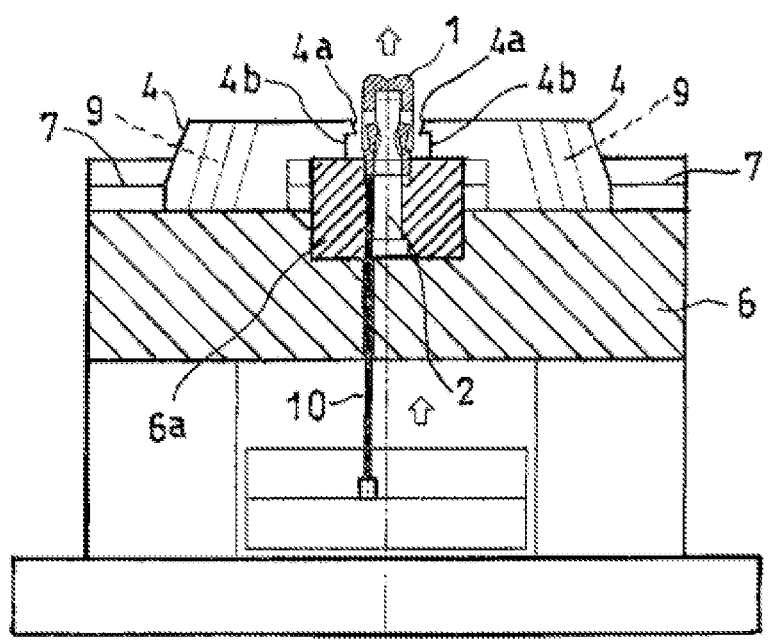
FIG. 3 is a cross-sectional view of the main part illustrating the middle process of removing the operating knob from a core pin by an ejector pin.
Figure 4:
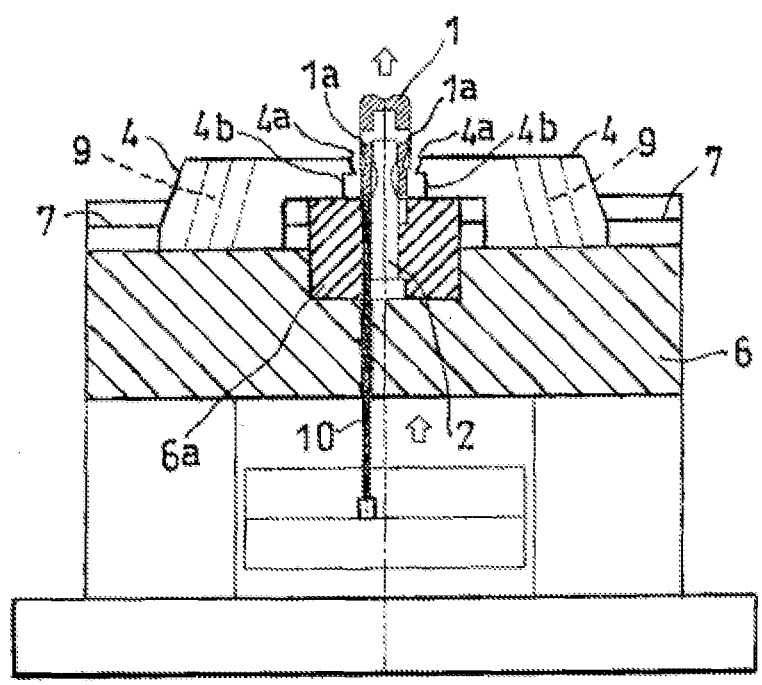
FIG. 4 is a cross-sectional view of the main part illustrating the process of removing the operating knob from the core pin by the ejector pin.
Figure 5:
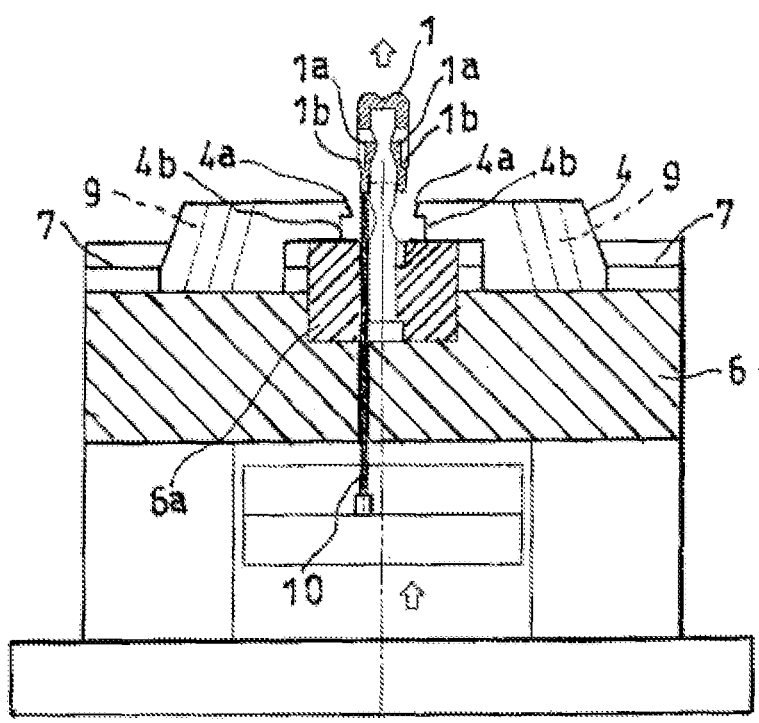
FIG. 5 is a cross-sectional view of the main part illustrating immediately before the process of removing the operating knob from the core pin by the ejector pin.
Figure 6:
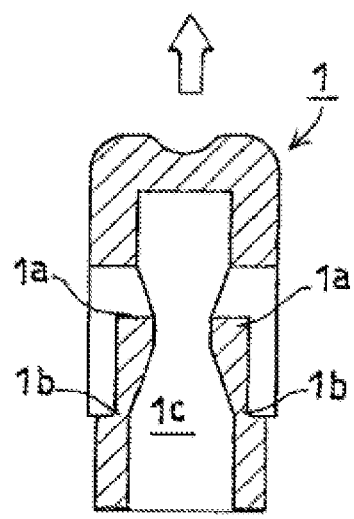
FIG. 6 is a partial cross-sectional view illustrating the relationship between the operating knob and the core pin.
Figure 6:
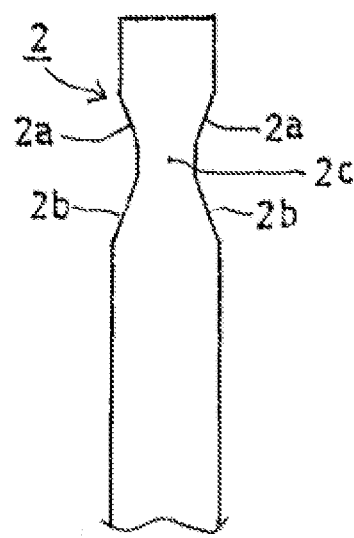
Figure 7:
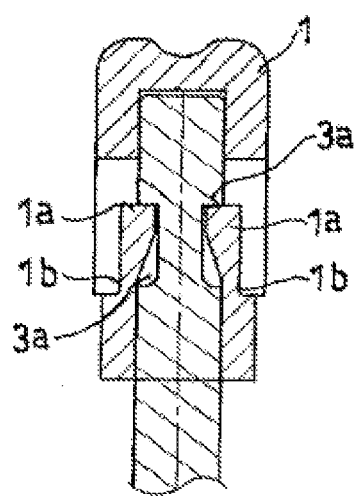
FIG. 7 is a cross-sectional view illustrating the state in which an operating lever is fitted to the operating knob.
Figure 7:
Figure 7:
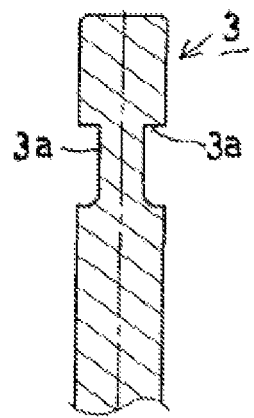

Next, after confirming curing of the injected resin, upper die 5 and lower die 6 are separated, with intermediate slide cores 4 restored (see FIG. 2). In the example of the drawing, upper die 5 is raised to be separated from lower die 6, with intermediate slide cores 4 restored from the advanced position in conjunction with the rise of upper die 5.

As intermediate slide cores 4 are restored, check claws 1a, 1a are formed in operating knob 1. That is, abutting part 4a formed in intermediate slide cores 4 to abut on upper inclined surface 2a of core pin 2 and step part 4b formed in the lower part of abutting part 4a cause the formation of check claws 1a, 1a in which thin-walled part 1b is formed in a base.

Subsequently, the rise of ejector pin 10 causes molded operating knob 1 to be removed from core pin 2. In the present invention, as thin-diameter part 2c is formed in core pin 2 but formed by upper inclined surface 2a and lower inclined surface 2b, check claws 1a, 1a are not stuck by core pin 2, with operating knob 1 smoothly removed from core pin 2 by ejector pin 10.

What is claimed is:

1. A molding die for making an operating knob, said operating knob including (i) a tubular body having an upper part and a lower part, and (ii) a check claw that protrudes inwardly of the tubular body, is outwardly swingable and is restorable, the molding die comprising:
   a core pin configured to form a fitting hollow part in the operating knob and having a thin-diameter part including an upper inclined surface and a lower inclined surface configured to correspond to the upper part of the operating knob;
   an upper die and a lower die configured to form a periphery of the upper part and the lower part of the operating knob; and
   at least one intermediate slide core which is advanceable towards and retractable away from the core pin between the upper die and the lower die, and has
      an abutting part configured to abut the upper inclined surface of the core pin, and
      a step part below the abutting part and configured to form a thin-walled part in a base of the check claw,
   wherein the abutting part and the step part are formed in a single piece advanceable towards and retractable away from the core pin between the upper die and the lower die.

2. The molding die according to claim 1, wherein the at least one intermediate slide core includes multiple intermediate slide cores.

3. The molding die according to claim 1, wherein the intermediate slide core is configured to be advanced and retracted in conjunction with a separation between the upper die and the lower die.

4. The molding die according to claim 3, further comprising:
   a control rod in the upper die or the lower die, said upper and lower dies being configured to be separatingly moved,
   wherein
   the control rod is provided at a predetermined angle relative to an axial direction of the core pin, and
   the intermediate slide core has a guide hole arranged at the predetermined angle relative to the axial direction of the core pin to receive the control rod.

5. The molding die according to claim 4, wherein
   the control rod is configured to extend in the guide hole of the intermediate slide core and not extend beyond the intermediate slide core when the abutting part abuts the upper inclined surface of the core pin.

6. The molding die according to claim 1, wherein
the upper and lower dies each have a core part coaxially arranged with the core pin and configured to form the periphery of the upper and lower parts of the operating knob.

7. The molding die according to claim 6, wherein
the single piece including the abutting part and the step part is advanceable towards and retractable away from the core pin on the core part of one of the upper and lower dies.

8. The molding die according to claim 6, wherein
the intermediate slide core is arranged between the core parts of the upper and lower dies, and
the intermediate slide core is configured to directly contact the core parts of the upper and lower dies when the abutting part abuts the upper inclined surface of the core pin.

9. The molding die according to claim 1, further comprising:
a guide rail on the upper die or the lower die to guide the intermediate slide core to advance toward and retract away from the core pin.

\* \* \* \* \*